United States Patent [19]

Katoh et al.

[11] Patent Number: 4,847,734
[45] Date of Patent: Jul. 11, 1989

[54] LIGHT EMITTING ELEMENT ARRAY

[75] Inventors: Masaaki Katoh, Osaka; Tsukasa Inoquchi, Nara, both of Japan

[73] Assignee: Sharp Kabushiki Kaisha, Osaka, Japan

[21] Appl. No.: 185,102

[22] Filed: Apr. 22, 1988

[30] Foreign Application Priority Data

Jul. 31, 1987 [JP] Japan ................. 62-193162

[51] Int. Cl.⁴ .............................. F21V 8/00
[52] U.S. Cl. ........................ 362/32; 362/244; 362/249; 362/800; 362/223
[58] Field of Search .......... 362/32, 23, 26, 223, 362/227, 235, 236, 244, 326, 332, 335, 246, 800, 249; 350/431, 437, 432, 433, 442

[56] References Cited

U.S. PATENT DOCUMENTS

| | | | |
|---|---|---|---|
| 3,920,980 | 11/1975 | Nath | 362/32 |
| 4,460,940 | 7/1984 | Mori | 362/326 |
| 4,630,180 | 12/1986 | Muraki et al. | 362/223 |
| 4,691,268 | 9/1987 | Benson | 362/223 |

*Primary Examiner*—Ira S. Lazarus
*Assistant Examiner*—D. M. Cox
*Attorney, Agent, or Firm*—Flehr, Hohbach, Test, Albritton & Herbert

[57] ABSTRACT

A light emitting element array has light emitting elements disposed on a base plate in an array and a rod-like converging lens is disposed adjacent and parallel to this array. The end surfaces of this rod-like lens are curved, or otherwise so shaped that light beams from the array are refracted towards the center of the lens, thereby increasing the relative distance on a target surface that can be effectively irradiated.

5 Claims, 5 Drawing Sheets

LIGHT EMITTING ELEMENT ARRAY

BACKGROUND OF THE INVENTION

This invention relates to a light emitting element array and more particularly to such an array used as a light source for a contact type image sensor or an optical image reader.

When image data are read by an optical image reader, a copier or a detector of one kind or another, a beam of light from a source is made incident upon the surface of a document or an object which is being inspected and the reflected beam is converted by a linear image sensor or a charge coupled device (CCD) into an electrical signal which serves as a data input. As the source of light for such a purpose, use is coming to be frequently made of light-emitting diodes (LEDs) because they are superior light sources from the point of view of both reliability and useful lifetime. Since the emitted light energy from a single LED is too small and adequate only for a local exposure, a number of LEDs are frequently arranged in a straight line to form an LED array.

As shown in FIGS. 4, 5 and 6 which are respectively a diagonal view, a side sectional view and a longitudinal sectional view, a prior art LED array typically comprises a plurality of LEDs 4 disposed in a straight line on a base plate 3 such as a printed wiring board. These LEDs are arranged at specified intervals determined by the design and reflective plates 5 are provided between the LEDs 4 such that a target surface 10 can be irradiated uniformly and the number of the LED elements can be reduced. A rod-like lens 6 is firmly attached to a reflective case 2 and supported thereby to be adjacent and parallel to the array of these LEDs 4 such that the light beams from the LED array are linearly focused on the target surface 10.

If the distribution of brightness is measured on the target surface 10 in the direction parallel to the lens 6, however, one obtains a curve as shown in FIG. 7 with a center part of length $L_2$ where the brightness is more or less uniform. This center part of length $L_2$ is flanked by end parts of length $L_3$ where the brightness gradually drops. In general, the length $L_2$ of the effectively (uniformly) irradiated part at the center where the brightness fluctuations are within a certain specified limit is quite small compared to the total irradiated length. If the length $L_2$ is desired to be about 216 mm (A4 size), a cylindrical rod-like lens 6 of length $L_1=246$ mm is required.

As shown schematically in FIG. 7 and more in detail in FIG. 8, the rod-like lens 6 used in a prior art light emitting element array, with which a brightness distribution as shown in FIG. 7 is obtained, has flat end surfaces 62 formed perpendicularly to its longitudinal direction. Thus, if the diameter of the rod-like lens 6 is 4.5mm, for example, the beams of light emitted from a point 11 which is 1 mm away from its surface and 3 mm longitudinally and internally displaced from the end surface 62 are refracted by the lens 6 as shown in FIG. 8 and scattered in the outwardly direction from the end surface 62. This explains the behavior of the curve in the ineffectively irradiated parts of length $L_3$ illustrated in FIG. 7.

To require a long lens means that the external dimension of the light emitting diode array which uses it must itself be large. This presents a serious problem if it is desired, for example, to provide a smaller and lighter image reader.

SUMMARY OF THE INVENTION

It is therefore an object of the present invention to provide a light emitting element array which uses a shorter rod-like lens but has an effectively irradiated part as long as obtainable by a prior art array.

A light emitting element array embodying the present invention, with which the above and other objects can be achieved, comprises a plurality of light emitting elements disposed on a base plate in an array and a rod-like converging lens disposed above and parallel to this array of light emitting elements and is characterized in that the end surfaces of this converging lens are processed at least in part so as to be convexly curved or polyhedral such that incoming light fluxes are refracted inwardly. With the end surfaces of the rod-like lens thus formed, the light fluxes which would refract outwardly can be bent inwardly instead towards the center part of the array. In other words, the loss of light fluxes to the flanking parts can be reduced and the ratio of the effectively irradiated part with respect to the total length of the lens can be significantly increased.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
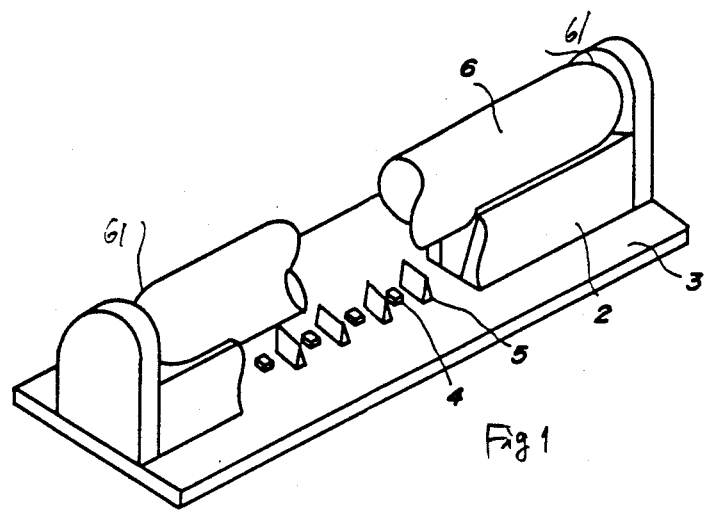
FIG. 1 is a diagonal view of a light emitting element array embodying the present invention with portions of its lens and supporting case removed.
Figure 2:
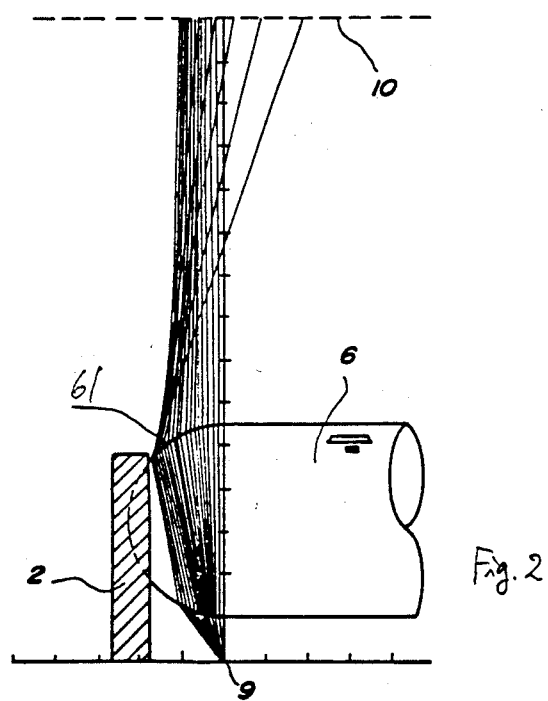
FIG. 2 is an enlarged sectional view of an end part of the array of FIG. 1 to show its optical characteristics.
Figure 3:
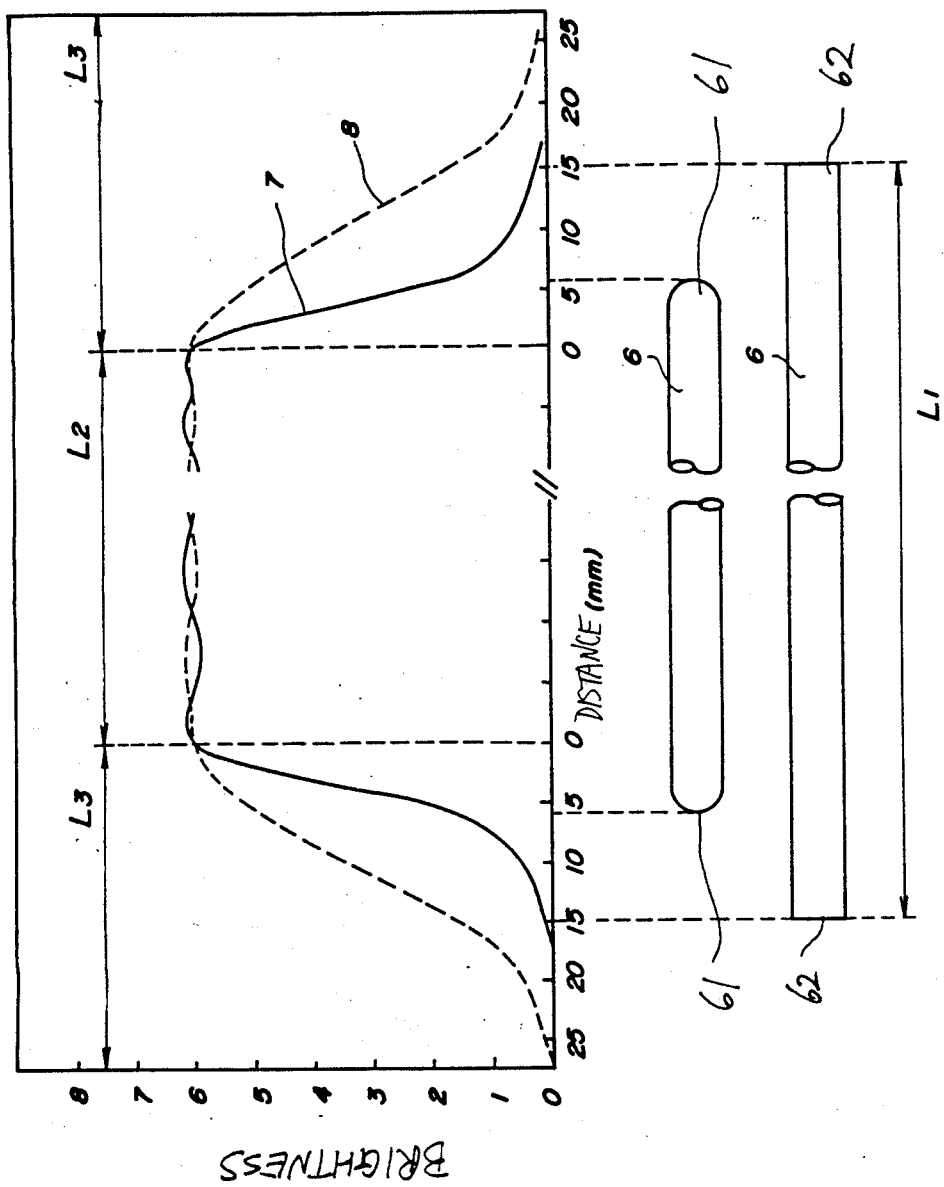
FIG. 3 is a graph for showing the relationship between brightness on the target surface and the length of the rod-like lens both for the light emitting element array embodying the present invention and for a prior art array.
Figure 4:
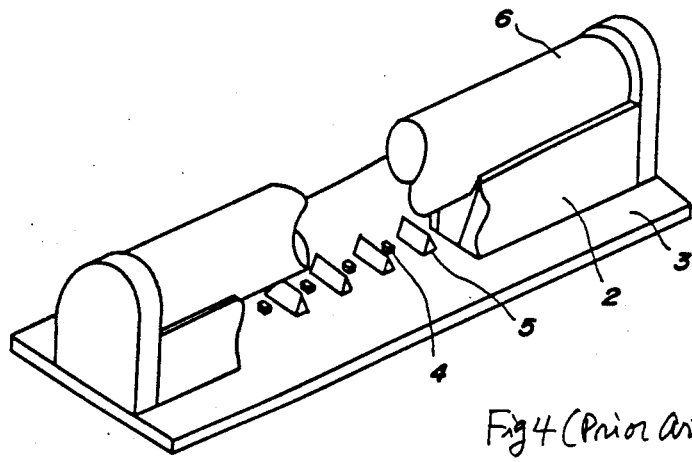
FIG. 4 is a diagonal view of a prior art light emitting element array with portions of its lens and supporting case removed.
Figure 5:
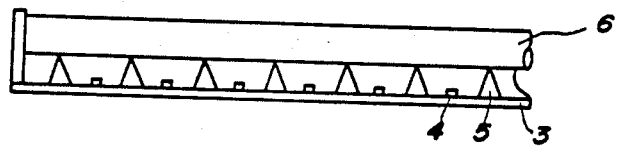
FIG. 5 is a side sectional view of the prior art array of FIG. 4.
Figure 6:
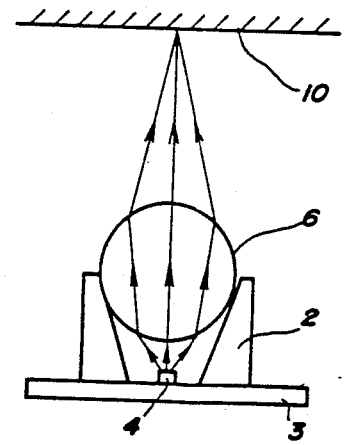
FIG. 6 is a longitudinal sectional view of the prior art array of FIG. 4.

A light emitting element array embodying the present invention is described by way of FIGS. 1, 2 and 3 wherein components which are substantially identical or at least similar to those shown in FIGS. 4-8 and explained above are indicated by the same numerals. Thus, the light emitting element array described here by way of an example comprises a plurality of LEDs 4 disposed in a straight line on a base plate 3 and cylindrical rod-like lens 6 of a transparent acryl resin material is supported and affixed above and near this array by a reflective case 2 of a white resin material. This lens 6 is characterized, unlike the prior art lens described in FIGS. 4–8, as having its end surfaces 61 processed so as to be convex at least in part such that the beams of light from the LEDs 4 are refracted significantly at the ends 61 towards the center part. This has the desired effect of providing a more uniform brightness distribution on the target surface 10.

The convexly curved shape of the end surface 61 is more clearly illustrated in FIG. 2 which also shows the inward refractions of light beams emitted from a point 9 which is 1 mm away from the surface of the lens 6 with diameter of 4.5 mm and inwardly displaced longitudinally by 3 mm from the end surface 61. FIG. 2 clearly shows, in contrast to FIG. 8, that the lens 6 of the present invention with convex end surfaces 61 can improve the brightness distribution at the end parts on the target surface 10.

Figure 7:
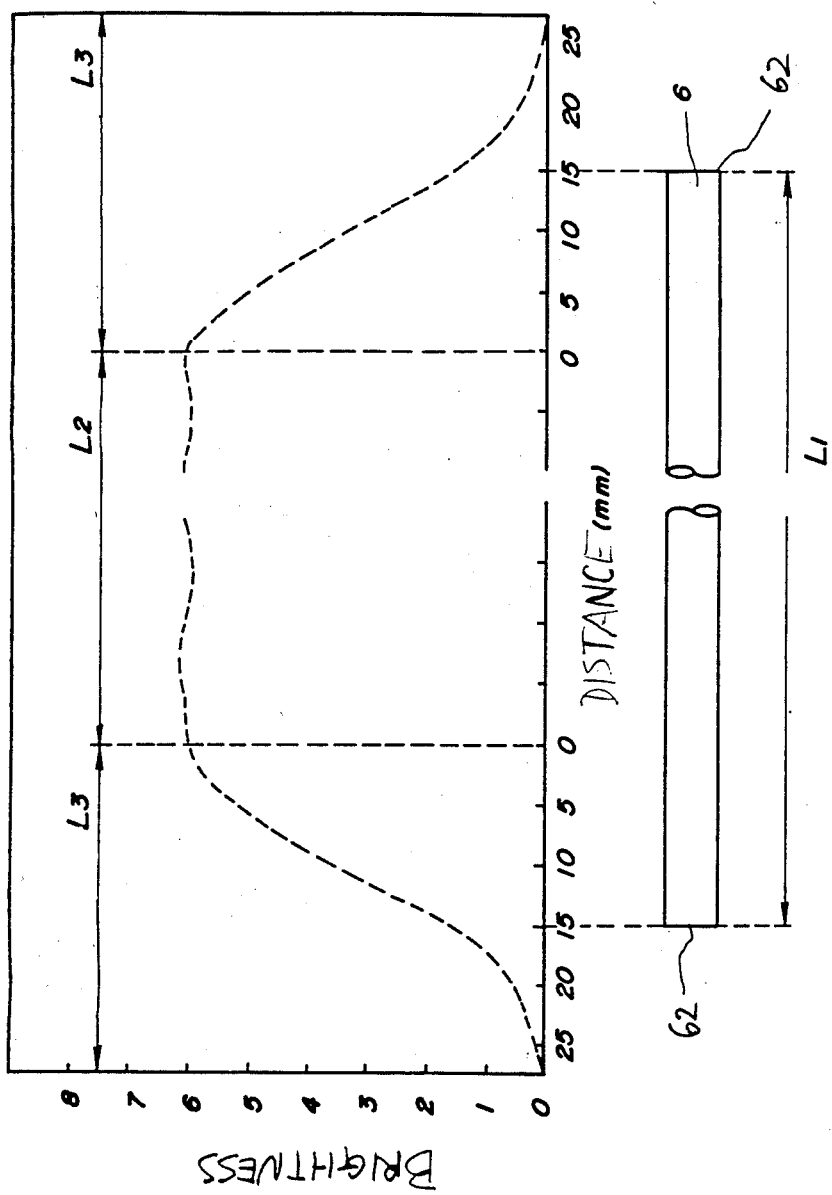
FIG. 7 is a graph for showing the relationship between brightness on the target surface and the length of the rod-like lens for the prior art light emitting element array of FIG. 4.
Figure 8:
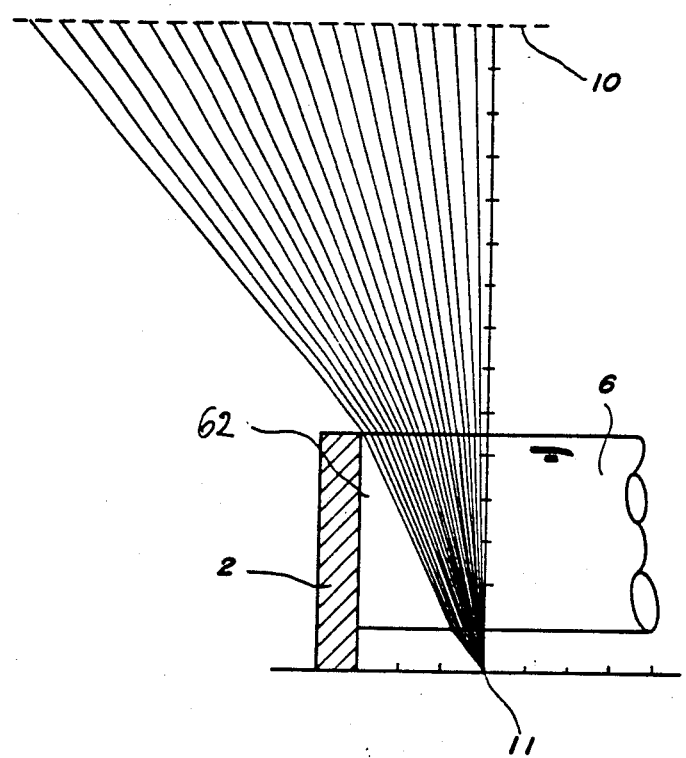
FIG. 8 is an enlarged sectional view of an end part of the prior art array of FIG. 4 to show its optical characteristics.

With a lens 6 with convexly formed end surfaces 61 according to the present invention, the brightness distribution in the longitudinal direction on the target surface 10 becomes as shown in FIG. 3 on which the curve shown in FIG. 7 is also redrawn for the purpose of comparison. FIG. 3 clearly shows that a lens according to the present invention with convex end surfaces 61, although significantly shorter than $L_1$, can provide an effectively irradiated part of the same length $L_2$. According to the illustrated example, both lenses are of an identical acryl resin material and 4.5 mm in diameter but the lens embodying the present invention has shorter ineffectively irradiated (flanking) parts $L_3$. While curve 7 for the lens of the present invention shows $L_3$ to be about 11 mm, Curve 8 for the prior art lens of FIGS. 4–8 has a loss of about 30 mm in its ineffectively irradiated part.

To effectively irradiate a length ($L_2$) of 216 mm corresponding to the A4 size, for example, a lens of 227 mm in length according to the present invention is required while a prior art lens of 246 mm in length would be required. Reduction in the loss achievable by the present invention in this case is from 30 mm to 11 mm, or a reduction by 63%.

As another example of comparison, a length ($L_2$) of 154 mm can be effectively irradiated by a lens embodying the present invention with 165 mm in length and 4.5 mm in diameter. If a prior art lens with flat end surfaces is used, a total length of 184 mm is required to uniformly irradiate the same distance. The effect of reduction in the overall size of an LED array becomes more pronounced as the effectively irradiated length $L_2$ becomes shorter.

The foregoing description of a preferred embodiment of the invention has been presented for purposes of illustration and description. It is not intended to be exhaustive or to limit the invention to the precise form disclosed, and many modifications and variations are possible in light of the above teaching. For example, the end surfaces 61 of the lens 6 need not be curved exactly as shown in FIG. 2. If the tip of the convexly protruding surface is buried inside the vertical wall portion of the reflective case 2 as shown in FIG. 2, for example, the buried portion may be cut perpendicularly to the longitudinal direction of the lens 6 because such a buried portion does not contribute to the bending of the light beams. Similarly, experiments have shown that a rod-like lens 6 with polyhedrally shaped end surfaces is also effective although polyhedrally shaped and curved end surfaces are not separately illustrated in the figures. As for the material for the rod-like lens 6, it is not limited to transparent acryls. Lenses made of glass, polycarbonate or the like may be substituted. In summary, the present invention teaches the use of a rod-like converging lens with convexly shaped end surfaces such that its conversion characteristics at the ends are so changed that refracted light beams tend to irradiate the center part. This has the favorable effect of increasing the relative length of the effectively (uniformly) irradiated part on the target surface and of thereby making it possible to produce smaller and lighter image readers.

What is claimed is:

1. In a light emitting element array having a plurality of light emitting elements disposed on a base plate in an array and a rod-like converging lens disposed parallel to said array of said light emitting elements, the improvement wherein said rod-like converging lens has end surfaces which are so shaped as to refract light beams from said light emitting elements into central directions.

2. The light emitting element array of claim 1 wherein said end surfaces are convexly curved.

3. The light emitting element array of claim 1 wherein said end surfaces are convexly polyhedral.

4. The light emitting element array of claim 1 further comprising a supporting means for securing said lens with respect to said base plate.

5. The light emitting element array of claim 4 wherein said supporting means has wall portions and said end surfaces are partially buried in said wall portions of said supporting means.

* * * * *